H. Call.
Air Engine.
N° 93,964. Patented Aug. 24, 1869.

Witnesses;
Luther Roby
J. E. Lang

Inventor;
Horace Call

United States Patent Office.

HORACE CALL, OF CONCORD, NEW HAMPSHIRE, ASSIGNOR TO HIMSELF AND J. B. RAND, OF SAME PLACE.

Letters Patent No. 93,964, dated August 24, 1869.

IMPROVEMENT IN APPARATUS FOR TRANSMITTING POWER BY THE MEDIUM OF AIR.

The Schedule referred to in these Letters Patent and making part of the same.

*Know all men by these presents:*

That I, HORACE CALL, of Concord, county of Merrimack, and State of New Hampshire, have invented a new and useful Process for Transmitting and Applying Power; and I do hereby declare the same to be fully described in the following specification, and illustrated in the accompanying drawing, of which—

The nature of my invention consists in transmitting power from one point or locality to another, and applying the same, which is accomplished by means of forcing air through a pipe, from the point or place where the power is generated, to any desired place in an adjacent town or city, or to several points at once, by using one main pipe, having branches leading to different points.

Figure 1:
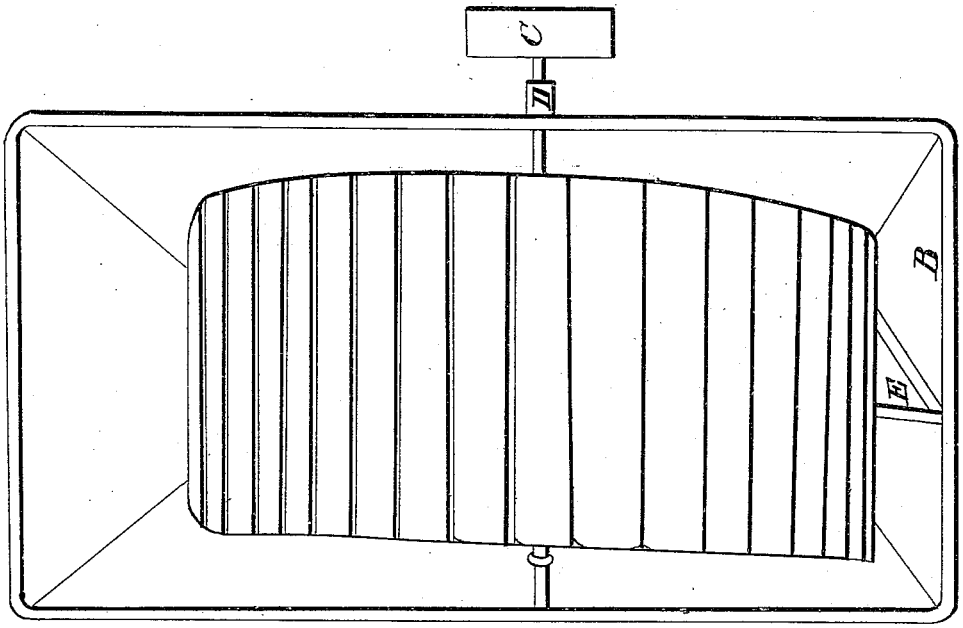
Figure 1 is a perspective view of the apparatus for receiving and applying the power, which consists of a tank, containing a water-wheel, with a pipe leading into the tank from the top, which is to discharge air into the water, under the floats or buckets affixed to the wheel on its inverted side.

In carrying out my invention, I extend a pipe from the starting-point to its place of destination, and, if the power is taken from a water-wheel, I drive, with the wheel, a force-pump of sufficient magnitude to consume that portion, or the whole of the power, which the wheel is capable of yielding, or that portion of it which I desire to make use of, and by means of the pump, I force the air through the pipe, which is to be of sufficient size to receive and convey it to the place where I desire to use the power, extending the pipe into a tank, as shown by fig. 1, at letter B.

The pipe to convey the air may be made of lead or iron, or any other metal or substance that will not allow the air to escape whilst passing through it. The tank may be made of wood or iron, or a cemented pit in the ground under the building, and should be made large enough to contain a wheel of sufficient size to receive the power transmitted, or that portion of it which I desire to make use of at that point.

The wheel I use is similar in shape to an overshot water-wheel, and may be made of wood or iron, or part of each material, as may be found most convenient; but if made of wood, the inside of the wheel should be filled with water, and a sufficient weight should also be attached to the wheel, in addition to the weight of water inside of it, and in such a manner as to balance it, that the wheel, when fully immersed in water, will have no more inclination to sink, if left free to do so, than it would to rise to the surface, and when fully balanced, it can be moved very easily, when confined in its bearings.

If the wheel is made of iron, it may be balanced by making a circular partition around the centre of the inside of the wheel, of sufficient dimensions, which, when filled with water, and the space between the outside of the circular partition and the inside of the rim of the wheel filled with air, so as to fully balance the wheel when under water, would avoid any difficulty arising from the swashing of the water inside of the wheel, if there were no partition, and it were but partly filled with water.

The wheel that is to receive the air in the tank will work with less friction if it is fully covered with water. And the pipe leading into the tank, over its top, is to be so placed, that the air discharged from it shall escape near the bottom of the tank, a little in front of the centre of the wheel, on its inverted side, and by well-known laws the air rises in the water nearly perpendicular, and will enter the buckets affixed to the wheel, immediately displacing the water in the buckets and filling them with air, which will press up and turn the wheel, and in its revolutions, will allow the air to escape from the buckets as each one revolves to the top of the wheel, and as soon as the air escapes, the bucket is immediately filled with water again, which will keep the wheel constantly balanced. The air which displaces the water from the buckets will press up about as much as the water would weigh which the air displaces, and will, in this way, furnish about the same amount of power as the same water would if it were applied on the other side of the wheel, in the manner in which overshot-wheels are driven by water. The shaft through the wheel also extends through the tank, on the end of which is placed a gear or pulley, C, from which, by means of a belt, machinery is driven.

To prevent water from escaping from the tank where the shaft passes through it, I use a common packing-box, known to mechanics, as shown by letter D.

The power transmitted may be obtained from water, steam, or any other source from which motive-power is derived, and may also be forced through the pipes by hydraulic pressure, instead of force-pumps.

Figure 2:
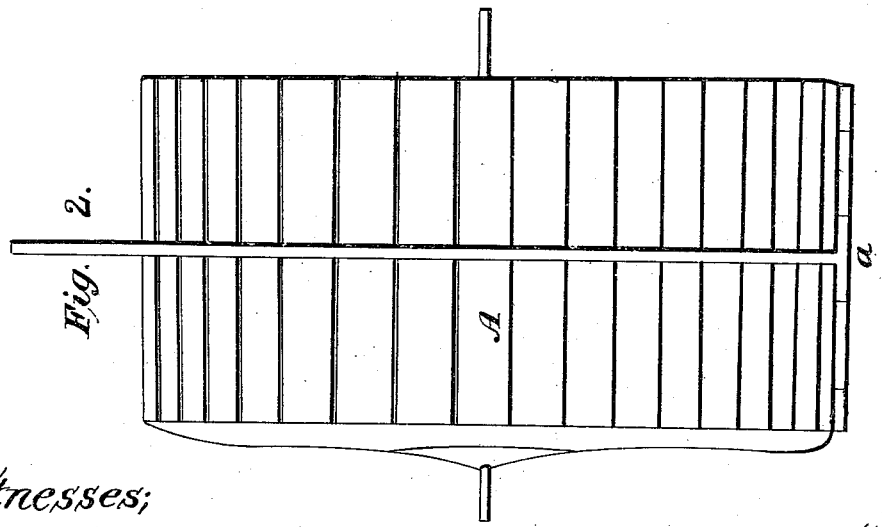
Figure 2 is a view of the wheel separate from the tank and that portion of the pipe which conducts the air into the tank, which is shaped, at its terminus, so as to be parallel with the buckets attached to the wheel, and having several holes, from which the air may be discharged, that all parts of the bucket receiving the air may be filled at the same time, as shown by letter A.

The apparatus to receive the air in the tank may also be, instead of a wheel, as shown by fig. 2, one or more chains or endless belts, passing over one pulley, stationed at the bottom of the tank, and one at the top, with inverted buckets affixed to them, which, in their revolutions, will receive and discharge the air.

Much valuable power can be obtained from our streams and rivers, adjacent to cities and large towns, which, from their location, are comparatively valueless, but by this process, the power that may be obtained from them, can be transmitted through one or more main pipes, by one or more force-pumps, and, by using branch-pipes, can be carried to different workshops, though they may be located at elevated points from where the power is transmitted.

I do not claim that all the power obtained at the starting-point can be transmitted without some loss by friction and otherwise, but I am satisfied a large portion of it can be, and the amount of loss sustained will not be large enough to materially impair the value of the process.

I am aware of the construction of wet gas-meters, in which the object is, of course, to measure an aeriform fluid, which enters at the axis and fills the concavity of curved partitions, extending from the axis to the periphery. That the pressure upon the aeriform fluids shall be light, is one of the conditions of the usefulness of these meters, as a heavy pressure would cause the loss of much gas and great annoyance therefrom, and the gas is, hence, introduced but an inch, more or less, below the surface of the water. Neither loss nor annoyance can occur from the escape of air, if it were possible, on its passage to my apparatus, and its effect applied near the axis of the wheel would be very feeble. It must operate upon the periphery of the wheel, and must thus effect many buckets at the same time. To this end I make the buckets shallow, in the line toward the axis of the wheel, and so curved that they shall retain their air-charge until their elevation and passage past meridian, (as expressed by millwrights.) It is, of course, important that the air shall be delivered so low as to enter the buckets at a position nearly vertical to the axes, or corresponding to the point of its departure above.

I, therefore, claim the combination and arrangement of a wheel, A, having curved or inclined buckets on its periphery, with an enclosing-case, B, and an air-supplying tube E, descending to or entering near its lower part when in position, said wheel having suitable attachments for connecting it with other machinery it is to operate, all substantially as shown and described.

HORACE CALL, [L. S.]

Witnesses:
   LUTHER ROBY,
   J. E. LANG.